W. H. THIEMER.
UNIVERSAL JOINT.
APPLICATION FILED JUNE 1, 1920.

1,378,985.

Patented May 24, 1921.
2 SHEETS—SHEET 1.

Inventor
William H. Thiemer,
By Hull, Smith, Brock & West,
Attys.

W. H. THIEMER.
UNIVERSAL JOINT.
APPLICATION FILED JUNE 1, 1920.

1,378,985.

Patented May 24, 1921.
2 SHEETS—SHEET 2.

Inventor
William H. Thiemer
By Hull, Smith, Buck & West
Att'ys.

UNITED STATES PATENT OFFICE.

WILLIAM H. THIEMER, OF CLEVELAND, OHIO, ASSIGNOR TO THE PARAGON MACHINE TOOL & MANUFACTURING COMPANY, OF CLEVELAND, OHIO, A CORPORATION OF OHIO.

UNIVERSAL JOINT.

1,378,985.        Specification of Letters Patent.        Patented May 24, 1921.

Application filed June 1, 1920. Serial No. 385,486.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints and has for its general object to provide a construction of such joints that will enable a driven shaft, arranged at an angle to a driving shaft, to be driven constantly at the same speed as the latter shaft.

As is well known, in the ordinary type of metallic or rigid universal joint, where the driven shaft is arranged at an angle with respect to the driving shaft, the speed of the driven shaft varies through the two maxima and minima during each rotation thereof. This change in velocity is rapid, occurring during each quarter revolution of the shaft. Where the driven shaft is arranged at an angle of 10° with respect to the driving or propeller shaft and the latter shaft is driven at a speed of 500 R. P. M., the maximum velocity of the driven shaft will be 508 and the minimum 492 R. P. M., making a variation of 16 R. P. M. during each quarter revolution. As the angle between the propeller or driving shaft and the driven shaft increases, the variation in speed is correspondingly increased. In the case of automobile transmission, this results, not only in increased friction upon the bearings of the universal joint, but in the imposition of severe strains upon the gears with which the driven shaft is connected and upon the fly wheel upon the propeller shaft.

Figure 1:
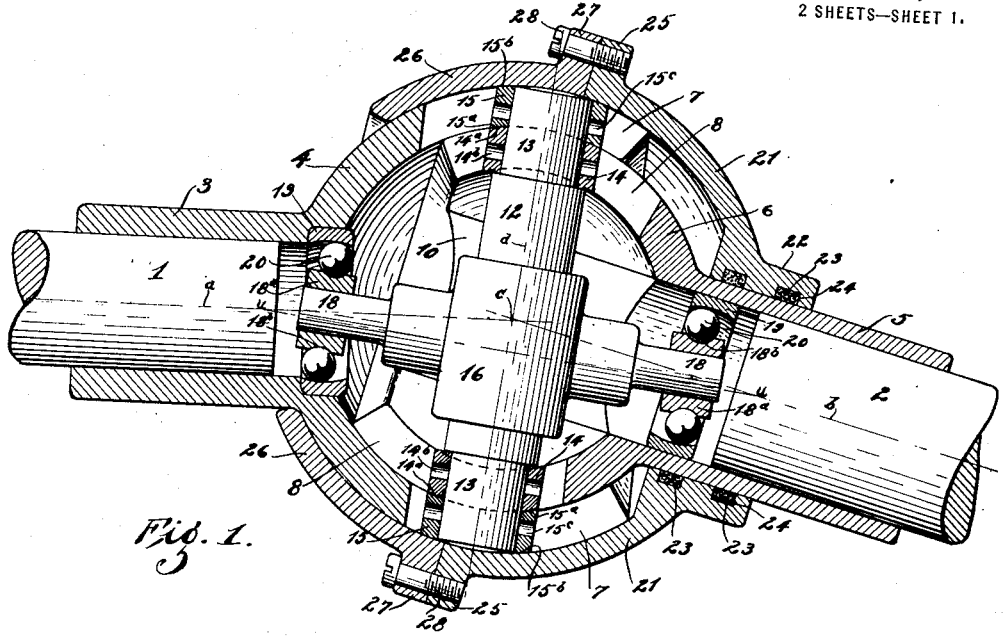
Figure 2:
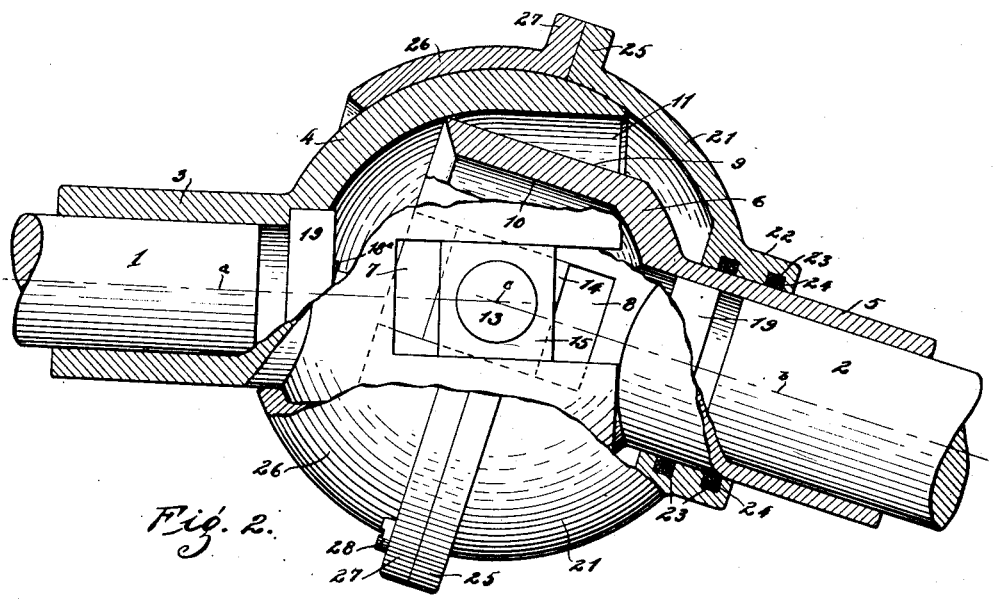
Figure 3:
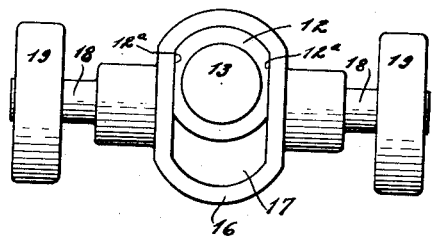

By my construction, I am enabled to couple two angularly disposed shafts by a metallic or rigid universal joint and at the same time to maintain a speed in the driven shaft which is equal at all times to that of the driving or propeller shaft. I accomplish these results in and through the construction shown in the drawings forming part hereof, wherein Figure 1 represents a central longitudinal view taken through two angularly disposed shafts connected by my joint; Fig. 2 a sectional elevation of the joint shown in Fig. 1, showing the positions of the parts at the end of a quarter revolution of the shafts, the casing being broken away; Fig. 3 a detail in plan of the hub and driver shown in Figs. 1 and 2; and Fig. 4 a view similar to Fig. 1 showing a modified form of my invention.

Describing the parts by reference characters, 1 denotes the driving or propeller shaft and 2 the driven shaft, the two shafts being shown as having their axes $a$ and $b$ disposed at an angle of 15° with each other. Seated upon and secured to the shaft 1 is a hub 3, having a cup 4, the inner and outer surfaces of which are spherical and concentric with the point of intersection $c$ of the axes $a$ and $b$. Mounted on the shaft 2 is an elongated hub 5 having a cup 6, the inner and outer surfaces of which (with the exceptions to be noted hereinafter) are formed each as the segment of a sphere concentric with the point $c$. The cup 4 is provided with a pair of diametrically opposed slots 7 extending inwardly from the outer end thereof and the cup 6 is provided also with a pair of diametrically opposed slots 8 extending inwardly from the outer end thereof. In order to permit the cup 6 to be assembled within the cup 4, its outer surface is flattened at 9, midway between the slots 8, the inner surface also being flattened at 10, to preserve the thickness of the cup wall. In order to permit the cup 6 to be received within the cup 4, the metal on the inside of the outer end of said cup is cut away, as indicated at 11, in planes parallel to the axis $a$, midway between the slots 7. This will allow the cup 6 to be inserted within the cup 4 with the rounded or spherical parts thereof fitting within the flattened parts 11. When the cup 6 has once been entered, it may be given a quarter rotation, bringing the slots 8 into register with the slots 7. The cups serve as coupling members between the shafts 1 and 2.

The cups 6 and 4 are connected by a driver, indicated generally at 12, and having pins or trunnions 13. Each pin is mounted within a pair of square rectangular bushing members, the inner member being indicated at 14 and the outer member being indicated at 15. Each inner member extends outwardly upon its trunnion pin as far as the outer edge of the slot 8, the outer end 14ª forming part of a spherical surface coinciding with the outer spherical surface of the cup 6. The inner end 15ª of the outer bushing member is also a portion of a spherical surface coinciding with the outer surface of the cup 6, and the outer end 15ᵇ of the outer bushing member 15 is formed as a spherical surface coinciding with the exterior surface of the cup 4 as well as the interior surface of the spherical casing (to be described hereinafter) which partially incloses the cups 4 and 6. Each inner bushing member 14 is provided with ports 14ᵇ and each outer bushing member 15 with ports 15ᶜ through which lubricant from within the casing (to be described hereinafter) may be supplied by centrifugal action to the trunnions 13.

Mounted upon the driver 12 is a hub 16. The hub is mounted so as to slide transversely with respect to the driver, being provided with an elongated slot 17 the opposite faces whereof are adapted to engage opposed flat faces 12ª on said driver. The hub 16 carries a pair of pins or trunnions 18 each provided with an inner raceway 18ª of an annular ball bearing, each raceway 18ª being provided with an annular groove 18ᵇ, the outer raceway 19 for each bearing being mounted within a seat provided within the inner ends of the hubs 3 and 5, respectively, whereby the outer raceways will revolve with the shafts 1 and 2. Each outer raceway has a concave groove for the balls 20, the groove being concentric with the center of the pin or trunnion 18.

The overlapping portions of the cups 4 and 6 and the slots therein are covered by a casing comprising a hemispherical cup member 21 having at one end a hub 22 adapted to surround the hub 5 and provided with packing rings 23 seated in annular grooves 24. The outer end of the cup member 21 is flanged, as indicated at 25, whereby it may be connected to a second cup member 26, also having a flange 27, as by means of bolts 28. The inner surface of the casing is spherical and is adapted to fit over the outer surface of the cup 4. The casing provides a receptacle for lubricant for the parts therewithin and also serves to protect the parts therein from the access of dust, etc.

With the parts constructed, and arranged as described, when power is applied to the shaft 1, it will be transmitted to the cup 4, bushings 15, pins 13, bushings 14 and cup 6. During the rotation of the shaft 1, the axes of the driver 12 will always be at right angles to the line $u$—$u$ which connects points in the axes $a$, $b$, equidistant from the intersection $c$, and will always bisect the exterior and interior angles of the axes $a$ and $b$. The driver 12 is forced into this path of least resistance by the hub 16 the pins or trunnions 18 whereof will be guided and thrust by the ball bearings 18ª—20, whose respective centers are the same. The speed of the shaft 2 will be at all times equal to that of the shaft 1 and the pressure exerted upon the bearing parts will be equalized.

Figure 4:
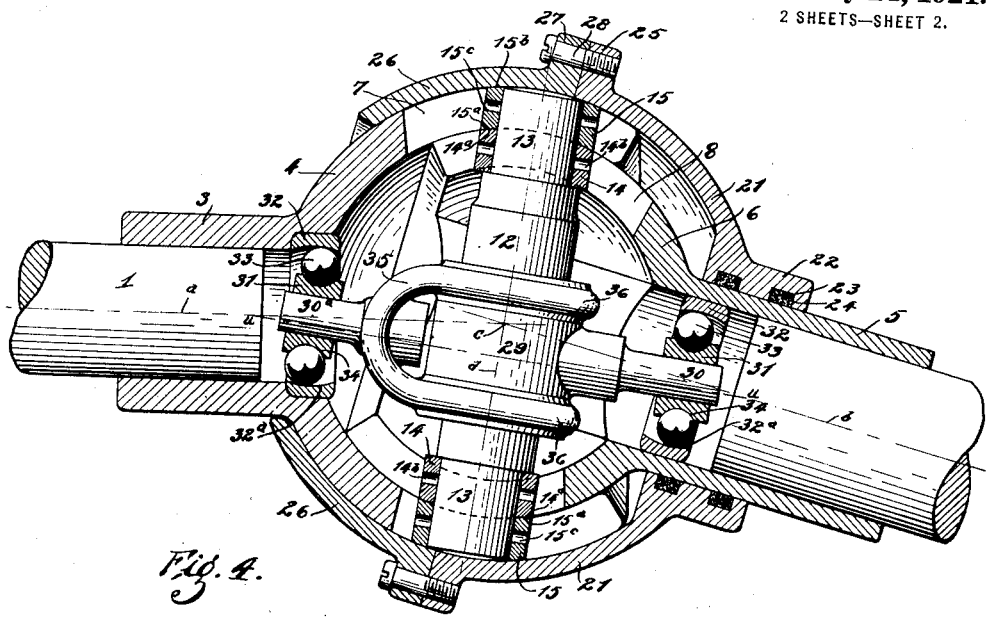

In Fig. 4 there is shown a modification of the invention shown in the three preceding views. In the last mentioned figure the parts 1—15ª inclusive and 21—28 inclusive, are identical with the like-designated parts on Figs. 1, 2 and 3, except that the driver 12 is preferably cylindrical at its central portion. Mounted on the cylindrical portion of the driver is a hub 29 having a pin or trunnion 30 carrying the inner raceway 31 of a ball bearing, the outer raceway 32 whereof is mounted within the hub 5, the balls 33 being seated in a groove 34 in the inner raceway. The inner surface of the outer raceway (32ª) is spherical, being concentric with the center or axis of the pin 30. 35 denotes a yoke provided with bearings 36 by means of which it is swiveled upon the driver 12, the hub 29 being interposed between said bearings. This yoke carries a pin 30ª similar to the pin 30, the pin 30ª being mounted within ball bearings similar to the bearings 31—34 and designated by like reference characters.

With the parts constructed and arranged as described, in connection with Fig. 4, as the shafts turn from the position shown in this view, the ball races straighten themselves and the yoke 35 holds one position and the hub and pin 30 its respective position relative to the driven shaft, both the yoke and the hub turning on the driver 12 and moving as a unit. As a result, the driver 12 is compelled to follow the path of least resistance, with its axis $d$ constantly bisecting the exterior and interior angles between the axes $a$ and $b$; the driven shaft always travels at the same speed as the drive shaft, with constant pressure upon the bearings.

Having thus described my invention, what I claim is:—

1. The combination, with a driving shaft and a driven shaft arranged angularly with respect thereto, of coupling members carried by the proximate ends of said shafts, respectively, a driver, a rocking connection between each end of said driver and said members, pins projecting in opposite directions from said driver and movably mounted thereon, and means carried by the driving shaft and the driven shaft and coöperating with said pins thereby to force the driver to follow a predetermined path during the rotation of said shafts.

2. The combination, with a driving shaft and a driven shaft arranged angularly with respect thereto, of coupling members carried by the proximate ends of said shafts, respectively, a driver, a rocking connection between each end of said driver and said members, pins projecting in opposite directions from said driver and rotatably connected thereto, and means carried by the driving shaft and the driven shaft and cooperating with said pins thereby to exert a thrust on opposite sides of the driver and cause the same to follow a predetermined path during the rotation of said shafts.

3. The combination, with a driving shaft and a driven shaft arranged angularly with respect thereto, of coupling members carried by the proximate ends of said shafts, respectively, a driver, a rocking connection between each end of said driver and said members, pins projecting in opposite directions from said driver and mounted to move with respect thereto, an outer ball race operatively connected with each of said shafts, an inner ball race mounted upon each pin, and balls interposed between the inner and the outer races.

4. The combination, with a driving shaft and a driven shaft arranged angularly with respect thereto, of coupling members carried by the proximate ends of said shafts, respectively, a driver, a rocking connection between each end of said driver and said members, pins projecting in opposite directions from said driver and mounted to rock with respect thereto, and an anti-friction bearing for each of said pins and adapted to exert a thrust upon said driver to maintain the latter in a predetermined path.

5. The combination, with a driving shaft and a driven shaft arranged angularly with respect thereto, of coupling members carried by the proximate ends of said shafts, respectively, a driver, a rocking connection between each end of said driver and said members, a hub mounted on the central portion of said driver and provided with a pin, a yoke mounted on the central portion of said driver and also provided with a pin, and an anti-friction bearing for each pin adapted to exert a thrust upon said driver to maintain the latter in a predetermined path.

6. The combination, with a driving shaft and a driven shaft arranged angularly with respect thereto, of coupling members carried by the proximate ends of said shaft, respectively, a driver, a rocking connection between each end of said driver and said members, a hub mounted on the central portion of said driver and provided with a pin, a yoke mounted on the central portion of said driver and also provided with a pin, an outer ball race operatively connected with each of said shafts, an inner ball race mounted upon each pin, said raceways having annular grooves therein, and balls interposed between the inner and outer races in the grooves thereof.

In testimony whereof, I hereunto affix my signature.

WILLIAM H. THIEMER.